Dec. 6, 1932.  L. C. WHITON, JR  1,890,070
DUST SEPARATOR CONTROL
Filed July 14, 1931    2 Sheets-Sheet 1

INVENTOR
Louis C. Whiton, Jr.
BY
ATTORNEYS

Dec. 6, 1932.  L. C. WHITON, JR  1,890,070
DUST SEPARATOR CONTROL
Filed July 14, 1931   2 Sheets-Sheet 2
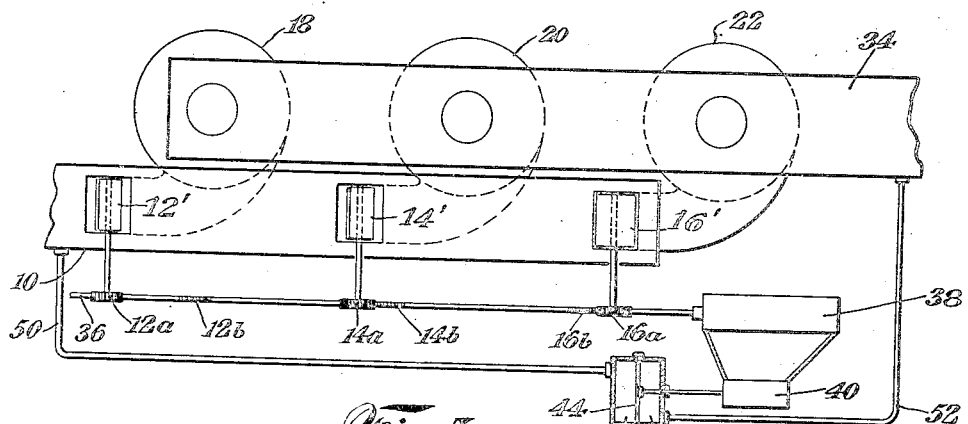
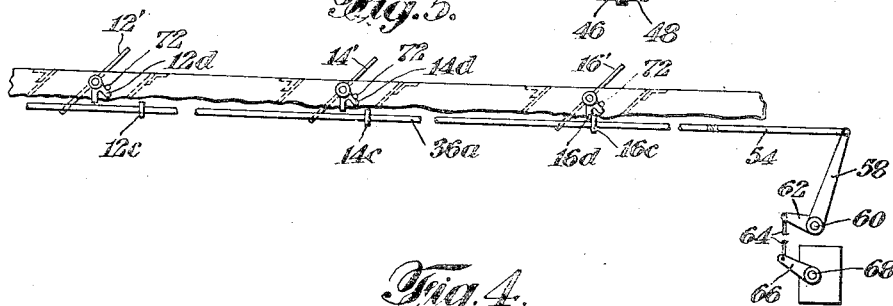
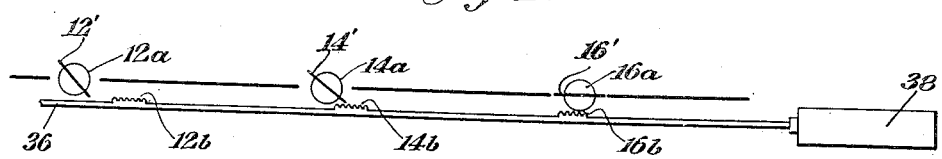
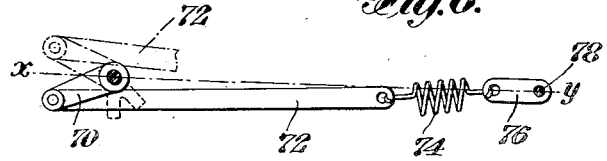
INVENTOR
Louis C. Whiton, Jr.
BY
ATTORNEYS Patented Dec. 6, 1932

1,890,070

UNITED STATES PATENT OFFICE

LOUIS C. WHITON, JR., OF NEW YORK, N. Y., ASSIGNOR TO PRAT-DANIEL CORPORATION, OF NEW YORK, N. Y., A CORPORATION OF NEW YORK

DUST SEPARATOR CONTROL

Application filed July 14, 1931. Serial No. 550,694.

This invention relates to improvements in dust separating apparatus and aims to provide means whereby a plurality of separators connected with a common inlet can be so controlled that the separators operate constantly at substantially maximum separating efficiency.

The above and other more detailed features of the invention will be fully apparent from the following specification and appended claims when read in connection with the accompanying drawings.

In the drawings:—

Fig. 3 is a diagrammatic plan illustrating means for automatically varying the number of separating units in operation in accordance with variations in pressure, velocity or volume of the dust carrying medium flowing through the system;

Fig. 4 is a diagrammatic side view of part of the apparatus shown in Fig. 3.

Figs. 5 and 6 are detail views illustrating the damper operating mechanism.

Figure 1:
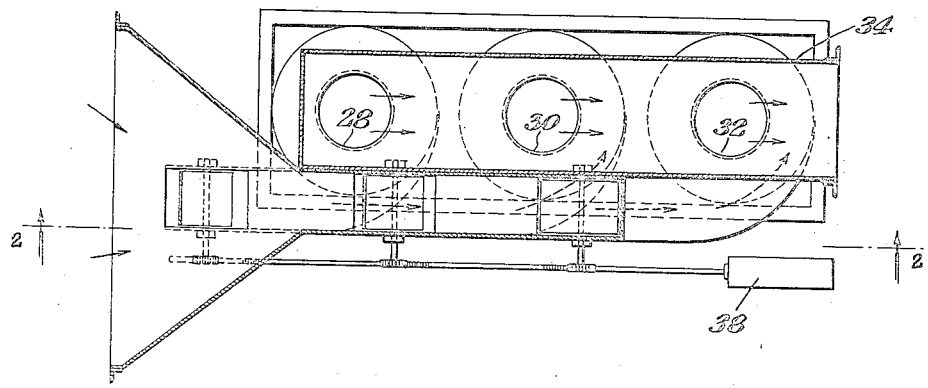
Fig. 1 is a plan view of a plurality of separator units connected with a common inlet duct and adapted to be controlled in accordance with the invention.

Referring in detail to the drawings, 10 represents an inlet duct which is connected by branches 12, 14 and 16 with dust separator units 18, 20 and 22.

Dampers 12', 14' and 16' control communication between the common duct 10 and the respective branches 12, 14 and 16 leading to the cyclone separators 18, 20 and 22.

The gas or other dust carrying medium enters the centrifugal cyclone separators on a tangent. The dust gravitates to the bottom of each separator, all of the separators discharging into the common dust outlet pipe 24. The dust freed gas leaves the separators through the central outlets 28, 30 and 32 of the separators 18, 20 and 22 and flows by way of a suitable duct 34 to the stack. The duct 34 as shown is common to all the separators.

The several separators 18, 20 and 22 are a known type of centrifugal separator commonly called "cyclone separators". Such separators are designed to operate most efficiently when a certain predetermined volume of gas or other dust carrying medium passes through them per given unit of time. When the volume of gas is diminished the dust separating efficiency is slightly lowered. Likewise when the velocity or pressure of the gas is diminished the separating action is lessened.

With a number of separators all connected to a common inlet duct, it will be understood that if the quantity of gas supplied to the duct diminishes appreciably there will be a lessening of efficiency of all of the separators connected therewith. To overcome this loss of efficiency due to variations in the quantity of dust carrying medium supplied to the common inlet, I provide means for varying the number of separators connected with the common supply duct so that the quantity of gas or other dust carrying medium flowing through any given separator remains substantially or approximately constant, therefore, each separator works at approximately the maximum dust separating efficiency for which it was designed. The means for varying the number of separators operatively connected with the common supply of dust carrying medium may be operated either manually or automatically. Preferably I provide automatic means. For example, I may provide means whereby the dampers 16', 14' and 12' may be successively closed as the volume of gas or other dust carrying medium supplied by the duct 10 diminishes. The volume of dust carrying medium bears a fairly fixed relationship to the velocity at which it flows through the system.

Due to the fact that the dust collecting efficiency of the centrifugal separators 18, 20 and 22 is dependent largely upon the velocity of gas flowing through the separators, if, for example, there are ten separators connected with the common inlet duct and receiving one thousand units of gas, the efficiency from the standpoint of dust collection will be much less if only five hundred units of gas are passed through the system, because the velocity through each separator would then be cut in half.

By the automatic control feature of my invention, the number of separators operatively connected with the common supply duct will be decreased when the number of units of gas are reduced, for example, from one thousand to five hundred units. Various types of control mechanism for automatically varying the number of separators operatively connected with the common supply duct in accordance with the volume of dust carrying medium flowing through the separator can be employed. For example, as shown diagrammatically in Figs. 3 and 4, the dampers 12′, 14′ and 16′ may be provided with gears $12^a$, $14^a$ and $16^a$. These gears are adapted to be turned by racks $12^b$, $14^b$ and $16^b$ secured to a rod 36 mounted in suitable guides and adapted to be reciprocated longitudinally by means of a piston operating in a cylinder 38. The racks $12^b$, $14^b$ and $16^b$ are spaced different distances from the gears $12^a$, $14^a$ and $16^a$ so that as the rod 36 is reciprocated first one gear is turned to close its damper and then the next gear is turned and so on, the arrangement being such that the racks successively come into position to actuate the dampers 16′, 14′ and 12′.

The movements of the actuating piston operating within the cylinder 38 are controlled by a valve mechanism indicated at 40 which in turn is actuated by a rod 42 connected to a diaphragm 44. This diaphragm is within a casing having chambers 46 and 48 which communicate respectively by means of pipes 50 and 52 with the common gas inlet duct 10 and the outlet duct 34. With the diaphragm and connections described, it will be understood that any variations in pressure of gas, or other dust carrying medium, supplied to the common inlet duct 10, will deflect the diaphragm 44. For example, if there is a pressure drop the diaphragm will deflect to the left. This will cause the rod 42 to act on the valve 40. This valve controls the supply of fluid pressure such as compressed air, oil under pressure, or water under pressure supplied to the cylinder 38. Assuming that there is a drop in pressure of the gas flowing to the common gas supply duct 10, the diaphragm actuated valve 40 will control the admission of fluid pressure to the cylinder 38 in such manner that the rod 36 will first cause the rack $16^b$ to engage the gear $16^a$ and thus close the damper 16′. If the pressure of gas supplied to the common inlet duct 10 continues to drop the rod 36 will move further to the left and bring the rack $14^b$ into engagement with the gear $14^a$ and close the damper 14′. This of course will cause all of the gas supplied to the duct to pass through the single separator 18, hence this separator will operate at substantially its normal efficiency because the gas will travel through it at substantially the normal velocity due to the cutting off of the other separators by closing the valves 14′ and 16′.

Of course it will be understood that when the pressure or quantity of dust carrying medium supplied to the common inlet duct again increases, the diaphragm 44 will be deflected in the opposite direction and the dampers 14′ and 16′ will be successively opened.

Figure 2:
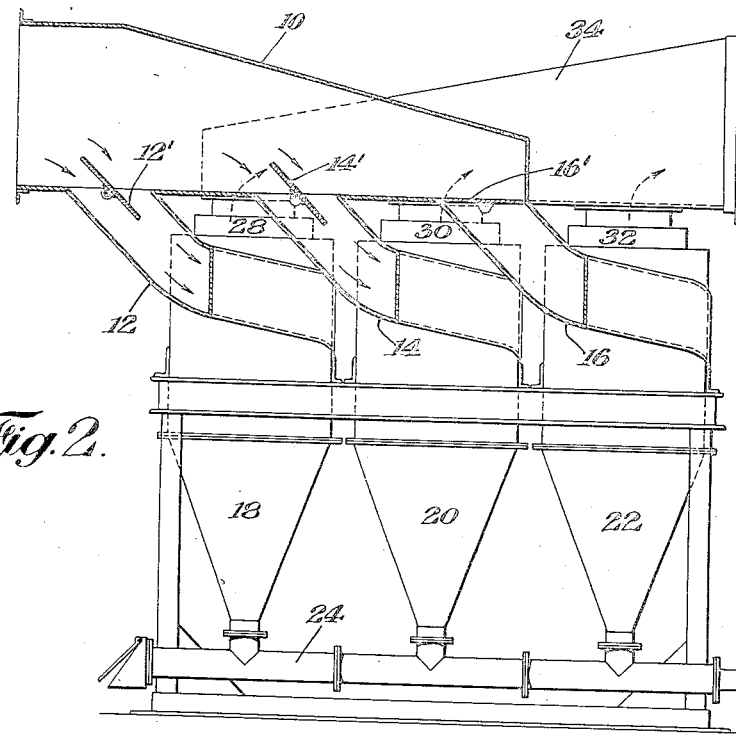
Fig. 2 is a vertical section on line 2—2 of Fig. 1.

The specific mechanism for automatically actuating the dampers in succession may take different forms. The form shown in Figs. 1 to 4 is merely diagrammatically illustrated for the sake of simplicity in exemplifying the principles involved. The damper operating mechanism as actually used in practice is illustrated in detail in Figs. 5 and 6. It includes a slidably mounted bar $36^a$ connected by a link 54 with a lever 58 carried by shaft 60 which carries an arm 62 connected by a link 64 with a lever 66 carried by shaft 68 which is adapted to be rocked in response to variations in the flow of dust or gas through the apparatus. Rod $36^a$ carries collars $16^c$, $14^c$ and $12^c$ which cooperate with the respective fork members $16^d$, $14^d$ and $12^d$ secured to the shafts which carry the respective dampers 16′, 14′ and 12′. The spacing of the collars $16^c$, $14^c$ and $12^c$ on the sliding shaft $36^a$ is such that the dampers 16′, 14′ and 12′ are successively operated. As illustrated best in Fig. 6, each of the damper carrying shafts has secured thereto, on the side remote from the forked members $16^d$, $14^d$ and $12^d$, a crank arm 70 which is connected by a link 72 with a tension spring 74 which is in turn connected with a suitable anchorage 76 carried by a stud 78. This spring mechanism serves to snap the valves quickly to closed position as soon as the crank arm 70 passes the center line indicated at $x$—$y$ in Fig. 6.

The arrangement is advantageous because due to the fact that the rod $36^a$ moves at a relatively slow speed, without such counterbalancing action of the spring it might have a tendency to quiver. With the counter-balancing spring, however, as soon as the crank arm 70 moves past its apex position or dead center the spring tends to snap the damper to either its fully closed or its fully opened position. When the dampers are snapped to closed position, their contact with the conduit in which they are mounted serves as a positive stop to bring them to rest in proper position. When they are snapped to open position, their movement will be arrested in the proper position by means of suitable stops such as stop pins 72 which coact with the forked levers $16^d$, $14^d$ and $12^d$.

Instead of using the type of damper control apparatus shown which operates in response to variations in pressure differential between the gas flowing in the inlet duct 10 and the outlet duct 34, I may use mechanism controlled by a steam flow meter of the boiler or alternatively I may employ mechanism which is responsive to the quantity of oil or other fuel burned when the dust separator is connected with a furnace. These factors equally affect the quantity of gas leaving the furnace and might be just as useful for the purpose of effecting the automatic control as the differential pressure control device diagrammatically illustrated.

The apparatus illustrated is well suited for separating dust from flue gases, but of course is not limited to such use. It may be utilized in connection with separating apparatus carrying various solids in suspension and the term "gas" used throughout the specificaiton and claims is intended to embrace any dust carrying medium such as air, or a mixture of gas and air.

While I have illustrated and described only three separators connected to the common supply duct, in practice there will frequently be many more, but the principle of operation will be the same regardless of the number of separator units employed.

Various modifications may be made by those skilled in the art without departing from the invention as defined in the following claims.

What I claim is:—

1. The combination with a plurality of dust separators all communicating with a common inlet duct, of means for interrupting the communication between one or more of said separators and said duct when the pressure or volume of the dust carrying medium flowing through said duct decreases.

2. The combination with a plurality of dust separators all communicating with a common inlet duct, of means for varying the number of separators in operation by and in accordance with the volume or velocity of dust carrying gas flowing through said duct.

3. The combination with a plurality of dust separators all communicating with a common inlet duct, of automatic means responsive to pressure variations for interrupting the flow of dust carrying medium to at least one of said dust separators.

4. The combination with a plurality of dust separators, of a common duct for conveying dust laden gas thereto, and respective dampers controlling the communication between some of said separators and said duct in response to a pressure drop in said duct.

In witness whereof, I have hereunto signed my name.

LOUIS C. WHITON, Jr.